(12) United States Patent
Barreto

(10) Patent No.: US 10,364,167 B2
(45) Date of Patent: Jul. 30, 2019

(54) CONTINUOUS-FLOW PHOTO-REACTOR FOR THE PHOTOCATALYTIC DESTRUCTION OF WATER SOLUBLE ETHERS

(71) Applicant: PURDUE RESEARCH FOUNDATION, West Lafayette, IN (US)

(72) Inventor: Reynaldo D Barreto, Westville, IN (US)

(73) Assignee: Purdue Research Foundation, West Lafayette, IN (US)

( * ) Notice: Subject to any disclaimer, the term of this patent is extended or adjusted under 35 U.S.C. 154(b) by 288 days.

(21) Appl. No.: 15/179,405

(22) Filed: Jun. 10, 2016

(65) Prior Publication Data

US 2016/0368787 A1 Dec. 22, 2016

Related U.S. Application Data

(60) Provisional application No. 62/173,528, filed on Jun. 10, 2015.

(51) Int. Cl.

| | | |
|---|---|---|
| *C02F 1/32* | (2006.01) | |
| *B01J 8/06* | (2006.01) | |
| *B01J 19/12* | (2006.01) | |
| *B01J 19/24* | (2006.01) | |
| *B01J 21/06* | (2006.01) | |
| *B01J 35/00* | (2006.01) | |

(Continued)

(52) U.S. Cl.
CPC ............ *C02F 1/325* (2013.01); *B01J 8/06* (2013.01); *B01J 19/123* (2013.01); *B01J 19/245* (2013.01); *B01J 19/2445* (2013.01); *B01J 21/063* (2013.01); *B01J 35/004* (2013.01); *B01J 35/0006* (2013.01); *B01J 35/026* (2013.01);

(Continued)

(58) Field of Classification Search
CPC ...... C02F 1/325; C02F 1/725; C02F 2101/34; C02F 1/30; C02F 1/76; C02F 1/66; C02F 2201/322; C02F 2103/06; C02F 2305/023; B01J 8/06; B01J 19/123; B01J 19/245; B01J 19/2445; B01J 21/063; B01J 35/004; B01J 35/0006; B01J 35/026; B01J 2208/021; B01J 2208/06; B01J 2219/00033; B01J 2219/1203; B01J 2219/0877; B01J 2219/0892
See application file for complete search history.

(56) References Cited

U.S. PATENT DOCUMENTS 3,633,884 A * 1/1972 Holmes ............... B01F 3/04439
210/170.09
6,197,206 B1 * 3/2001 Wasinger ................. C02F 1/78
210/760

(Continued)

FOREIGN PATENT DOCUMENTS

CN 201033747 Y * 3/2008

OTHER PUBLICATIONS

Photocatalysis sewage treatment equipmentGAO Jiwei; Yang, Hui (Inventors). Zhejiang University (Assignee). CN 201033747 Y. (Published Mar. 12, 2008). Translation included. (Year: 2008).*

(Continued)

*Primary Examiner* — Walter D. Griffin
*Assistant Examiner* — Cameron J Allen
(74) *Attorney, Agent, or Firm* — Purdue Research Foundation; Zhigang Rao

(57) ABSTRACT

Disclosed herein are methods and systems for achieving degradation of ethers.

8 Claims, 8 Drawing Sheets

(51) Int. Cl.
*B01J 35/02* (2006.01)
*C02F 1/72* (2006.01)
*C02F 101/34* (2006.01)
*C02F 103/06* (2006.01)
*C02F 101/32* (2006.01)

(52) U.S. Cl.
CPC ......... *C02F 1/725* (2013.01); *B01J 2208/021* (2013.01); *B01J 2208/06* (2013.01); *B01J 2219/00033* (2013.01); *B01J 2219/0877* (2013.01); *B01J 2219/0892* (2013.01); *B01J 2219/1203* (2013.01); *C02F 2101/322* (2013.01); *C02F 2101/34* (2013.01); *C02F 2103/06* (2013.01); *C02F 2201/3227* (2013.01); *C02F 2305/10* (2013.01); *Y02W 10/37* (2015.05)

(56) References Cited

U.S. PATENT DOCUMENTS

| | | | | |
|---|---|---|---|---|
| 6,464,867 | B1* | 10/2002 | Morita | B01F 3/04985 |
| | | | | 210/202 |
| 2011/0240566 | A1* | 10/2011 | Engelhard | B01D 53/885 |
| | | | | 210/748.1 |
| 2013/0153483 | A1* | 6/2013 | Morazzoni | B01J 19/123 |
| | | | | 210/263 |

OTHER PUBLICATIONS

Barreto, R., Photocatalytic Degradation of MTBE in TiO2 Slurries: A Proposed Reaction Scheme, Wat. Res., 5., 1995., 1243.

Zang, Y., Photocatalytic Decomposition of MTBE in Aqueous Slurry of TiO2, Appl. Catal. B; Environ, In Press 57, 2005, p. 275-282.

Mehrab, M., Photocatalytic Degradation of THF, 1,4 Dioxane, and Their Mixtures with TiO2, Int. J. of Photoenergy, 2, 2000, p. 67.

Bideau, M., Photocatalysis of Formic Acid Oxidation by Oxygen in Aqueous Medium, J. Photochem., 14, 1980, p. 291.

Bideau, M., Photo-Oxidation of Acetic Acid by Oxygen in the Presence of and Dissolved Copper Ions, J. Photochem. Photobiol. A, Chem., 61, 1991, p. 269.

Barreto, R., Photocatalytic Destruction of ETBE and TAME, Proceedings of the Environmental Chemistry Division, 219th ACS National Meeting, San Francisco, CA. Mar. 2000, vol. 40, No. 1, p. 232.

Barreto, R., Photocatalytic Destruction of MTBE,1,4-Dioxane and Other Water Soluble Ethers using Visible Light, Proceedings of the Environmental Chemistry Division, 240th ACS National Meeting, Boston, MA. Aug. 2011.

* cited by examiner

CONTINUOUS-FLOW PHOTO-REACTOR FOR THE PHOTOCATALYTIC DESTRUCTION OF WATER SOLUBLE ETHERS

CROSS-REFERENCE TO RELATED APPLICATIONS

The present U.S. patent application is related to and claims the priority benefit of U.S. Provisional Patent Application Ser. No. 62/173,528, filed Jun. 10, 2015, the contents of which is hereby incorporated by reference in its entirety into this disclosure.

TECHNICAL FIELD

The present disclosure generally relates to continuous flow photoreactor systems, and in particular to a system and method for achieving photocatalytic degradation of ethers in ether-containing starting materials.

BACKGROUND

This section introduces aspects that may help facilitate a better understanding of the disclosure. Accordingly, these statements are to be read in this light and are not to be understood as admissions about what is or is not prior art.

The contamination of ground water by methyl tertiary butyl ether (MTBE) or organic solvents such as 1,4-dioxane is a concern throughout the United States. Contamination usually results from surface spills or leaks at storage facilities. Techniques currently employed to remediate this contamination include air stripping using high air to water ratios followed by incineration, adsorption onto surfaces such as activated carbon, chemical treatment with Fenton's reagent and hydrogen peroxide, and biodegradation. All of these remediation schemes can be costly and time-consuming. The chemical inertness of ethers in general and MTBE (and Dioxane) in particular makes remediation of these chemical solutions both expensive and difficult to apply to large systems. These compounds are highly soluble in water, chemically very stable, and difficult to remove from water once they are introduced. Activated carbon can be employed to ether contaminated water but the bed life is diminished by as much as 75%. Air stripping is costly and not very effective due to the high solubility of MTBE and Dioxane in water. Bioremediation has also proven to be ineffective as these compounds inhibit the growth of anaerobic bacteria. While these standard treatment regimens are adequate on a small scale, such as a single residence or building, they cannot be scaled up to the point where they are applicable for larger applications, such as a municipal water system. There is therefore an unmet need for novel remediation techniques to address the problems posed by these compounds.

SUMMARY

In one aspect, a photocatalytic system is presented, which can include a series of photoreactors, wherein the series of photoreactors include continuous flow photoreactors.

In another aspect, a photocatalytic system is presented, which can include at least two photoreactors, wherein the at least two photoreactors are connected in parallel, and wherein the continuous flow photoreactors can include a glass substance coated with a catalyst.

In yet another aspect, a method for achieving degradation of ethers is presented, which can include exposing an ether-containing starting material to an ultraviolet (UV) light source to thereby achieve degradation of ethers.

DESCRIPTION

Figure 1B:
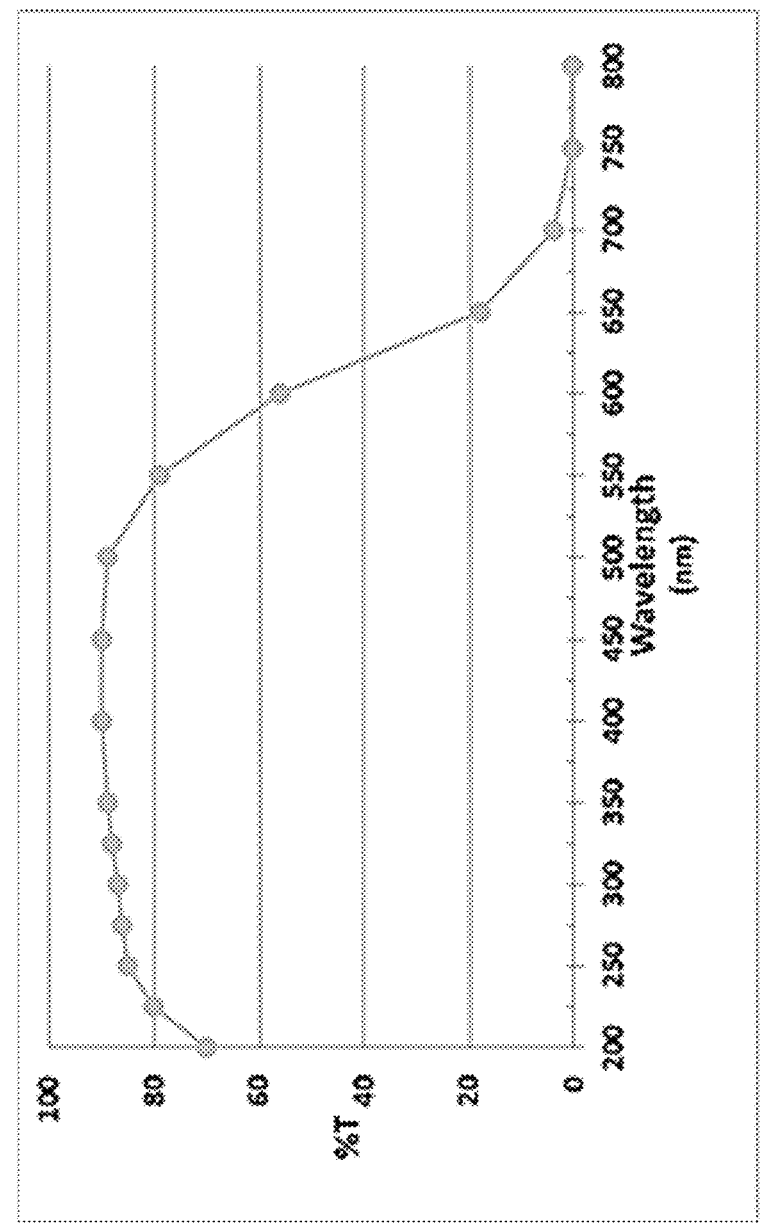
FIG. 1B is a plot showing US photoreactor transmittance.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In response to the unmet need, novel remediation techniques and systems to address the problems posed by the compounds mentioned above (which can be thought of as ether-containing starting materials or water soluble ethers) are disclosed herein.

In one aspect, a photocatalytic system is disclosed. The photocatalytic system can include a series of photoreactors, wherein the series of photoreactors include continuous flow photoreactors. The series of photoreactors can include at least two photoreactors coupled in series. The continuous flow photoreactors can include tubing that is substantially filled with a glass substance coated with a catalyst. The catalyst can be a catalyst that is able to couple to the glass, for example $TiO_2$. The glass substance can be a plurality of glass beads or glass wool. In an embodiment, the photocatalytic system is oxygenated. In another embodiment, the photocatalytic system is oxygenated with silicone tubing.

In yet another aspect, a photocatalytic system is disclosed which has at least two photoreactors, wherein the at least two photoreactors which can be continuous flow photoreactors and are coupled in parallel. The continuous flow photoreactors can include tubing that is substantially filled with a glass substance coated with a catalyst that can bind to glass, for example $TiO_2$. The glass substance can be a plurality of glass beads or glass wool. In an embodiment, the photocatalytic system is oxygenated. In another embodiment, the photocatalytic system is oxygenated with silicone tubing.

In yet another aspect, a method for achieving degradation of ethers is presented. The method can include exposing an ether-containing starting material to an ultraviolet (UV) light source to thereby achieve degradation of ethers. The UV light can be for example, fluorescent light or sunlight. The method can also include exposing the ether-containing starting material in an oxygenated system. The oxygenated system can include silicone tubing. The method can also include pumping the ether-containing starting material through a tube. The tubing can include a glass containing substance, for example plurality of glass beads or glass wool. The tubing is substantially filled with the glass containing substance. The glass containing substance can be coated with a catalyst that can bind to the glass, for example $TiO_2$. The ether can be any one of or a combination of tertiary butyl ether (MTBE), ethyl tert-butyl ether (ETBE), tert-Amyl methyl ether (TAME), and dioxane.

It should be appreciated that while the herein disclosed systems and methods can be used for degradation of ethers, such application is not intended to be limiting. The herein disclosed systems and methods can be configured to be used for breaking down other water soluble contaminants and pharmaceuticals which may occur in water supplies as well.

EXAMPLES

Methods that utilize $TiO_2$ photocatalytic degradation using UV light have proven to be successful in mineralizing a wide range of organic contaminants in water. Methyl tertiary butyl ether (MTBE), ethyl tert-butyl ether (ETBE), and tert-Amyl methyl ether (TAME) can be readily degraded with a batch slurry process. The processes yielding pseudo first order rates constants of $1.2 \times 10^{-3}$ $s^{-1}$ for MTBE, $4.63 \times 10^{-4}$ $s^{-1}$ for ETBE, and, $7.72 \times 10^{-4}$ $s^{-1}$ for TAME during the initial stages of the reactions. Ultimately, these ethers were converted to $CO_2$ with greater than 90% efficiency. These processes were then applied to 1,4-Dioxane and diisopropyl ether (DIPE) showing rates of $1.1 \times 10^{-3}$ $s^{-1}$ and, $6.3 \times 10^{-4}$ $s^{-1}$ respectively. In these cases, over 80% of the initial substrate was destroyed in less than 150 min.

A photocatalytic process was carried out using a 1 liter Pyrex glass photoreactor with a jacketed borosilicate immersion well. The UV source was a 450 W medium pressure mercury lamp that was inserted into the reactor through the immersion well. A 0.25 M solution of $CuSO_4$ was circulated through the jacket of the immersion well to filter out light below 290 nm and to act as a cooling system.

Reaction runs included 990 ml of water and 0.10 g of $TiO_2$ that was purged with bubbling $O_2$ for a minimum of 1 hour with mixing. Solutions of 100 ppm were prepared from 0.1% stock solutions of the ethers. Reactions were run for 4 hours (240 minutes) under a positive pressure of $O_2$. Samples were removed at 0, 10, 20, 30, 45, 60, 90, 120, 180, and 240 minutes using a 30 mm, 0.45 μm Teflon syringe filter and stored in 2.5 ml amber glass septed vials.

Sample Analysis: Sample pH was determined at the time of sampling. Substrate concentrations were determined using gas chromatography (GC). (GC parameters—HP 5890; HP-Wax 25 m column, id. 0.53 mm. He—10 ml/min, 2.0 μl injection volume, injector at 250° C., FID detector at 250° C., Temperature program 40° C. for 1 min, ramp to 100° C. at 15° C./min., 100° C.-107° C. at 1.5° C./min., 107° C.-150° C. at 30° C./min., hold for 3 min.).

Figure 1A:
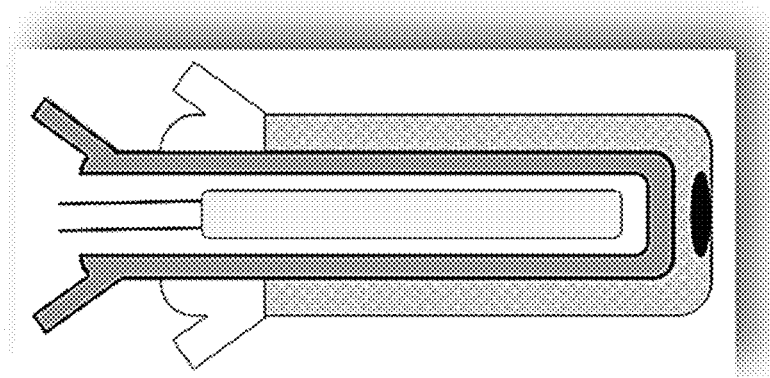
FIG. 1A is a diagram of a quartz/ultraviolet (UV) photoreactor.

Referring to FIGS. 1A and 1B, previous work on MTBE, ETBE and TAME used a Quartz Immersion well that allowed the batch slurry process to be energized by UV light of 170-375 nm. The processes were found to be pseudo first-order reactions yielding rates constants of $1.2 \times 10^{-3}$ $s^{-1}$ for MTBE, $4.63 \times 10^{-4}$ $s^{-1}$ for ETBE, and, $7.72 \times 10^{-4}$ $s^{-1}$ for TAME during the initial stages of the reactions.

Figure 2B:
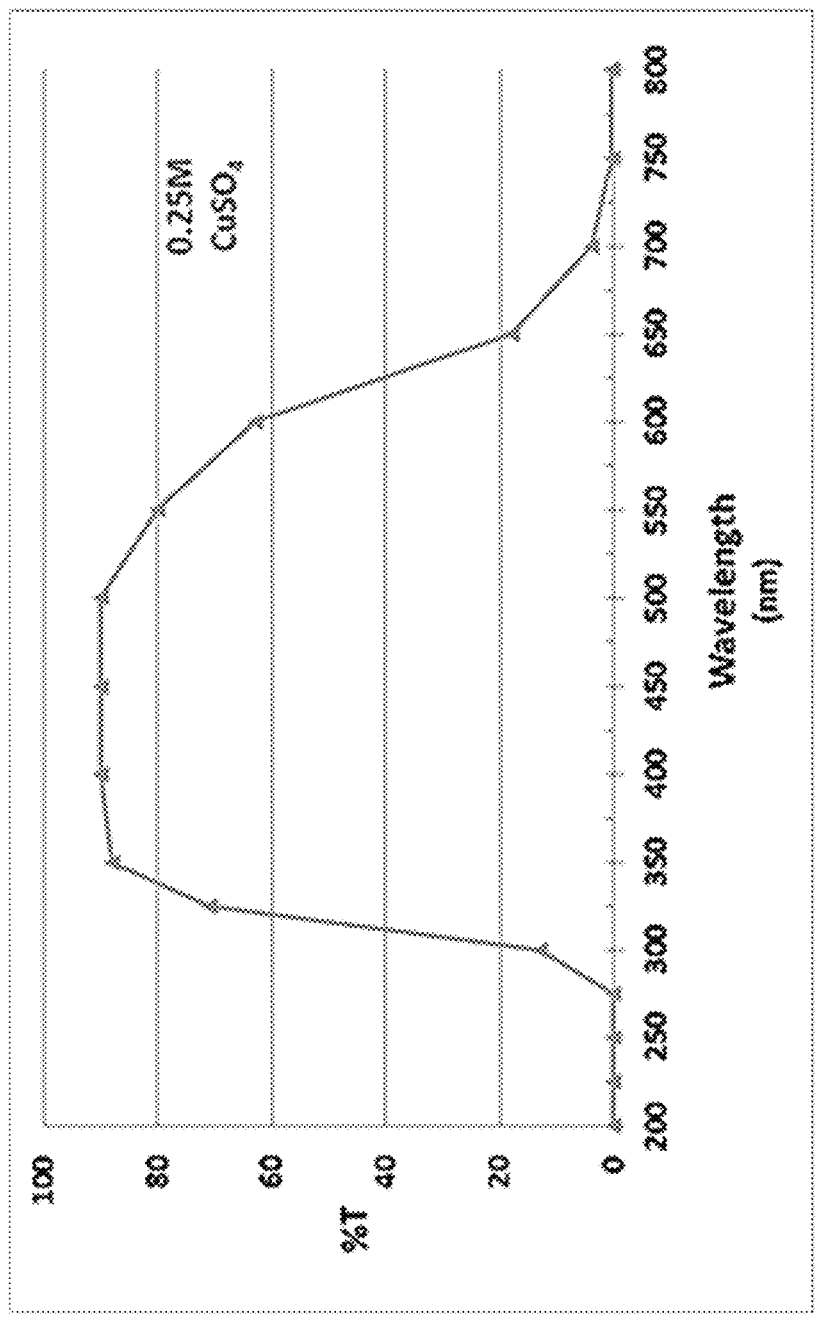
FIG. 2B is a plot showing visible photoreactor transmittance.
Figure 2A:
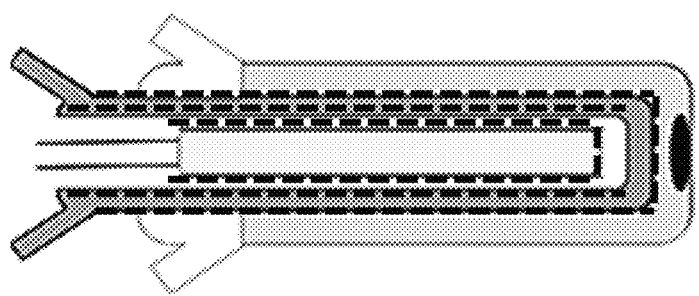
FIG. 2A is a diagram of a pyrex/visible photoreactor.
Figure 3:
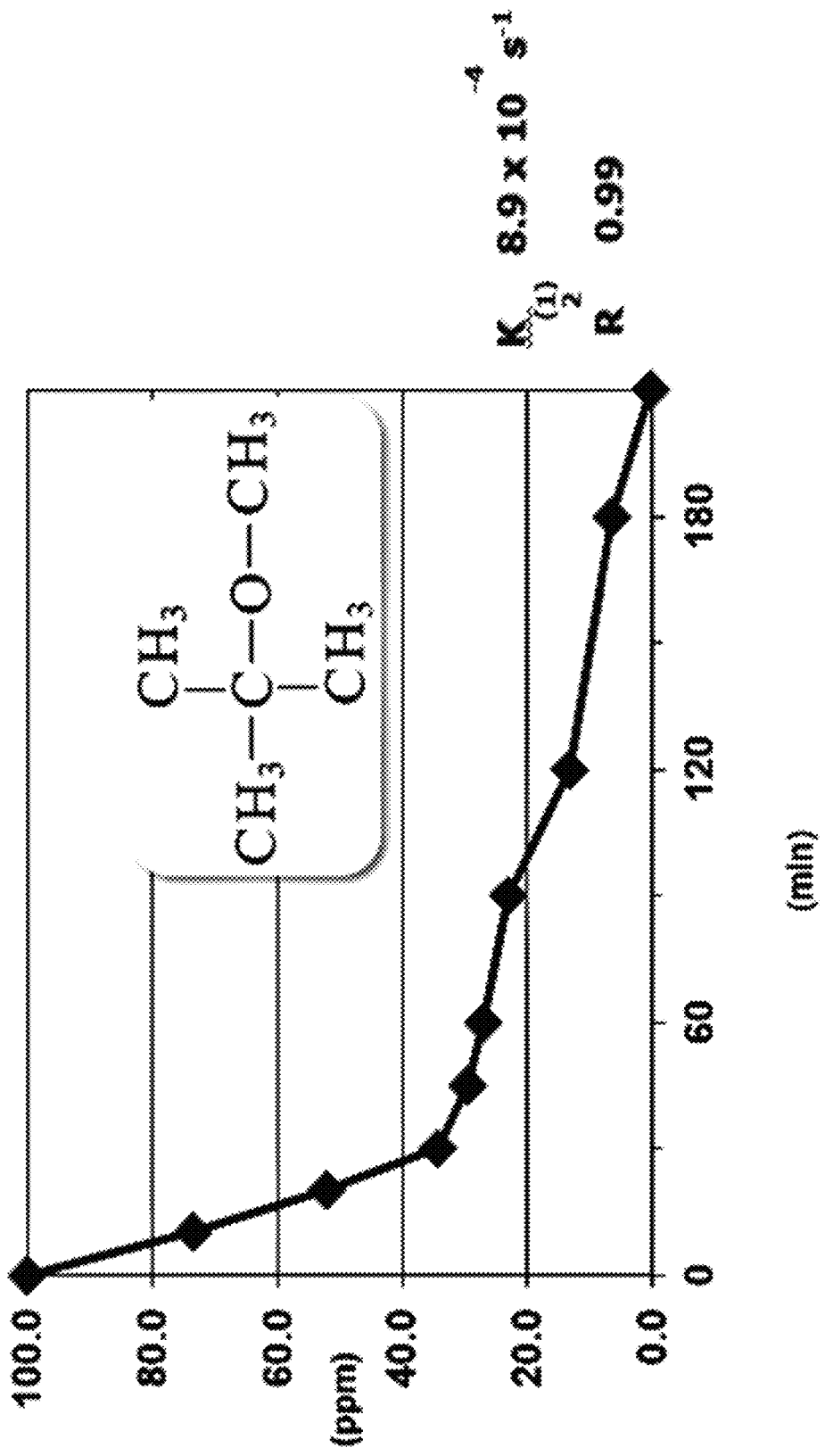
FIG. 3 is a plot showing degradation of MTBE using short wavelength US light.

The Pyrex immersion well illuminated light below 325 nm but allowed UV wavelengths of 325-375 nm (FIGS. 2A and 2B). The data for MTBE show that the reaction still proceeds with a pseudo first order $8.9 \times 10^{-4}$ $s^{-1}$, approximately the same as seen in the quartz reactor. (FIG. 3) The data for ETBE and TAME also showed that these processes proceeded with observed rates of $7.9 \times 10^{-4}$ $s^{-1}$ and $1.0 \times 10^{-3}$ $s^{-1}$ respectively, again similar to that observed previously.

Figures 4A, 4B:
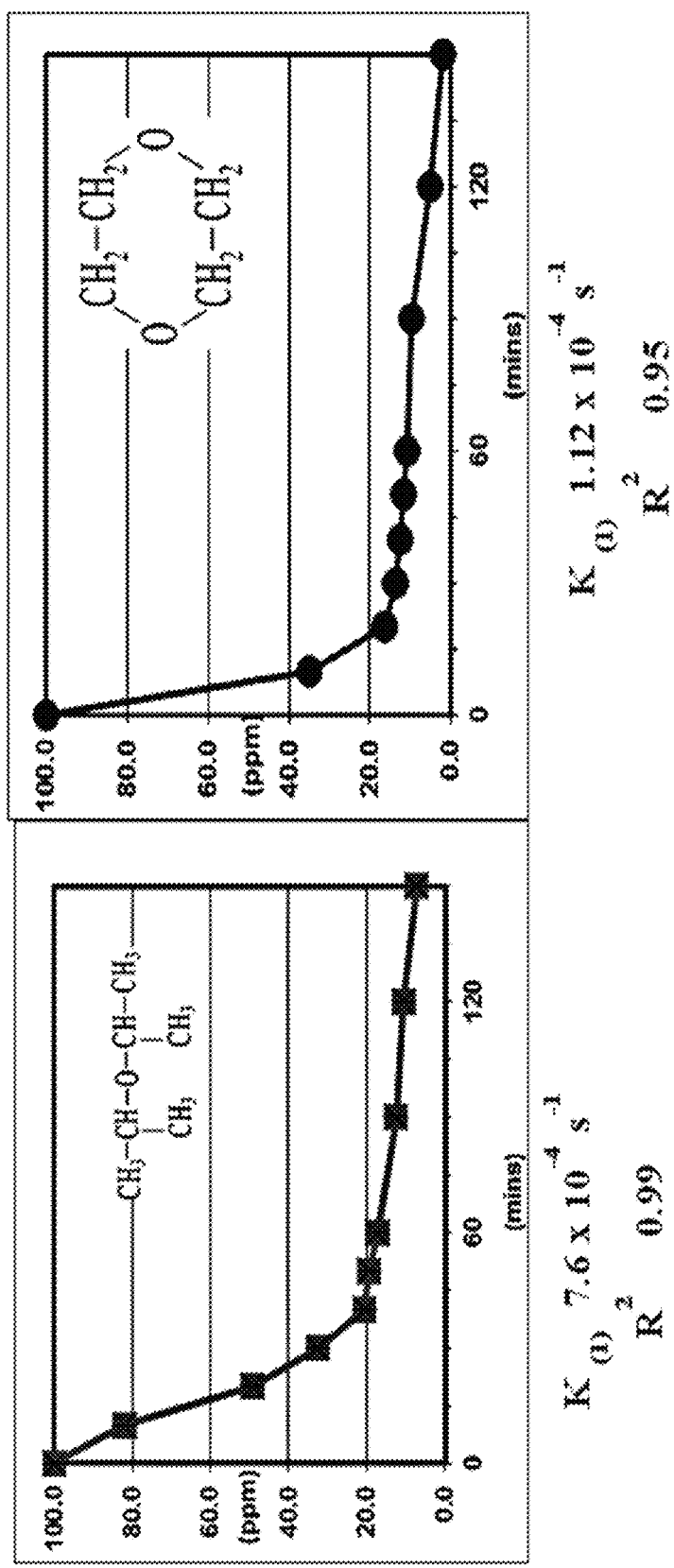
FIGS. 4A and 4B are plots showing the degradation of DIPE and DIOX using short wavelength UV light.

When the process was applied to two new compounds, di-isopropyl ether (DIPE) and 1,4 Dioxane (DIOX), the reactions were observed to proceed similarly to that observed for the other ethers (FIGS. 4A and 4B) The Rates for these processes were found to be $7.6 \times 10^{-4}$ $s^{-1}$ and $1.1 \times 10^{-4}$ $s^{-1}$ respectively, indicating photocatalytic oxidation of ethers as a common mode of degradation.

The photocatalytic destruction of MTBE and the role of $TiO_2$ have been discussed previously. In this process, MTBE was initially oxidized to the ester t-butyl formate (TBF). In turn, TBF was hydrolysed, in acidic solution, to TBA and formic acid (reaction scheme (1)) The process continues on TBA until the products acetic acid and $CO_2$ are formed. Both acetic and formic acids are also photocatalysed to $CO_2$ in the presence of $O_2$ and $TiO_2$.

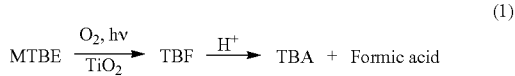

(1)

Based on the intermediates identified in the reactions of TAME and ETBE, a similar pathway can be proposed. Initially, the ethers are photooxidized to the esters, t-amyl formate (TAF) in the case of TAME and t-butyl acetate (TBAc) in the case of ETBE. These products then react by hydrolysis, in acidic solution, to produce TAA and TBA respectively, both of which were identified in their respective processes. (reaction schemes (2) and (3)) Such ester hydrolysis processes have been well documented.

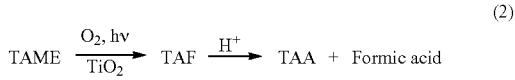

(2)

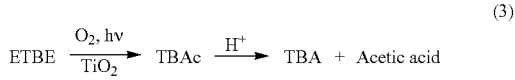

(3)

From this data, it can be concluded that MTBE, ETBE, TAME, DIPE and DIOX are susceptible to photocatalytic degradation by long wavelength UV light (325-375 nm) using $TiO_2$ as a catalyst. The processes are pseudo first-order reactions with rates of $1.0 \times 10^{-4}$ $s^{-1}$-$1.0 \times 10^3$ $s^{-1}$. Reaction intermediates, t-butyl alcohol for ETBE and t-amyl alcohol for TAME, indicate that both compounds initially follow similar photocatalytic reaction pathways to that observed for MTBE.

Figure 5A:
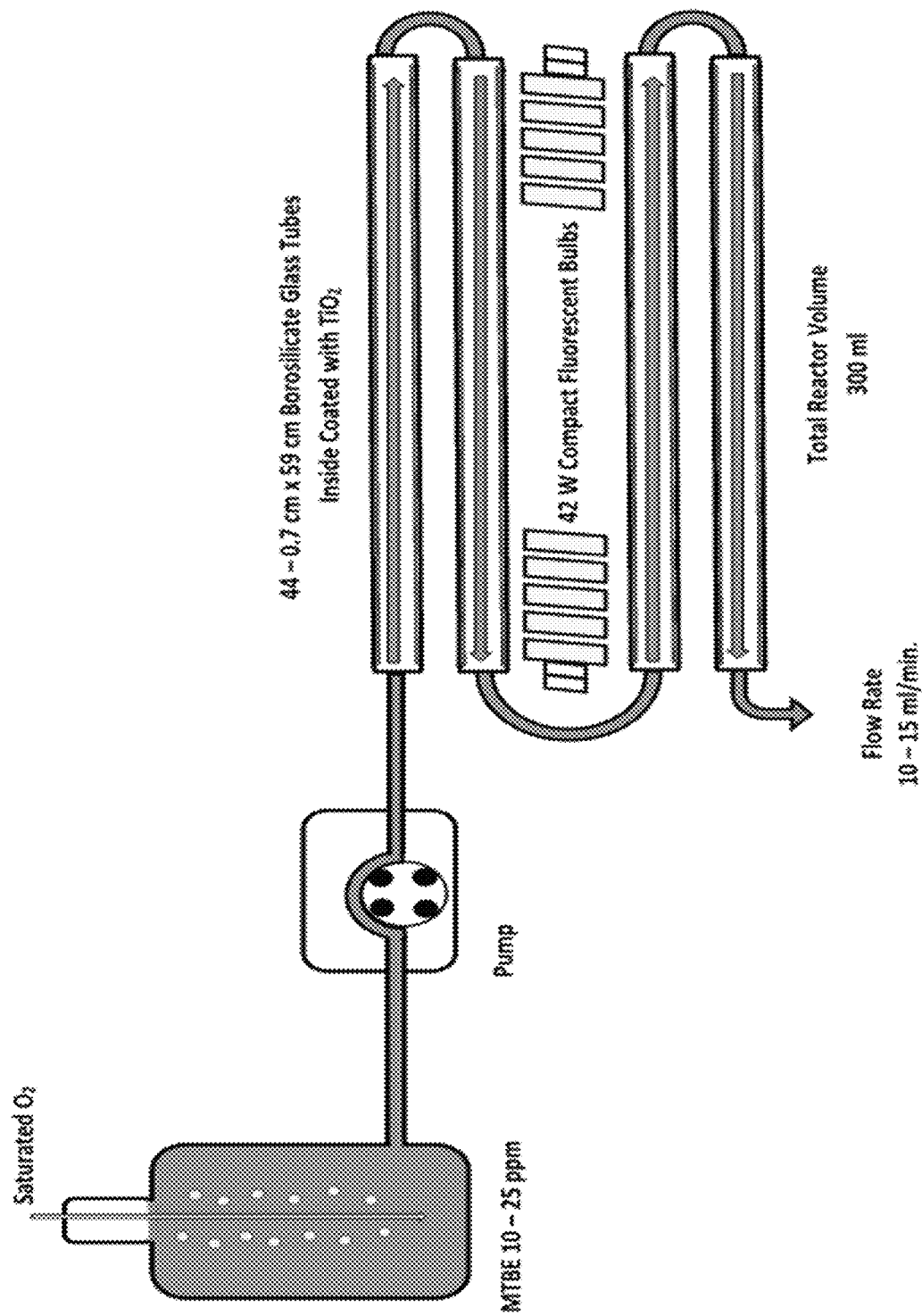
FIG. 5A is a diagram of an example in-series photoreactor which includes borosilicate glass tubes coated with $TiO_2$ using compact fluorescent bulbs as a light source.
Figure 5B:
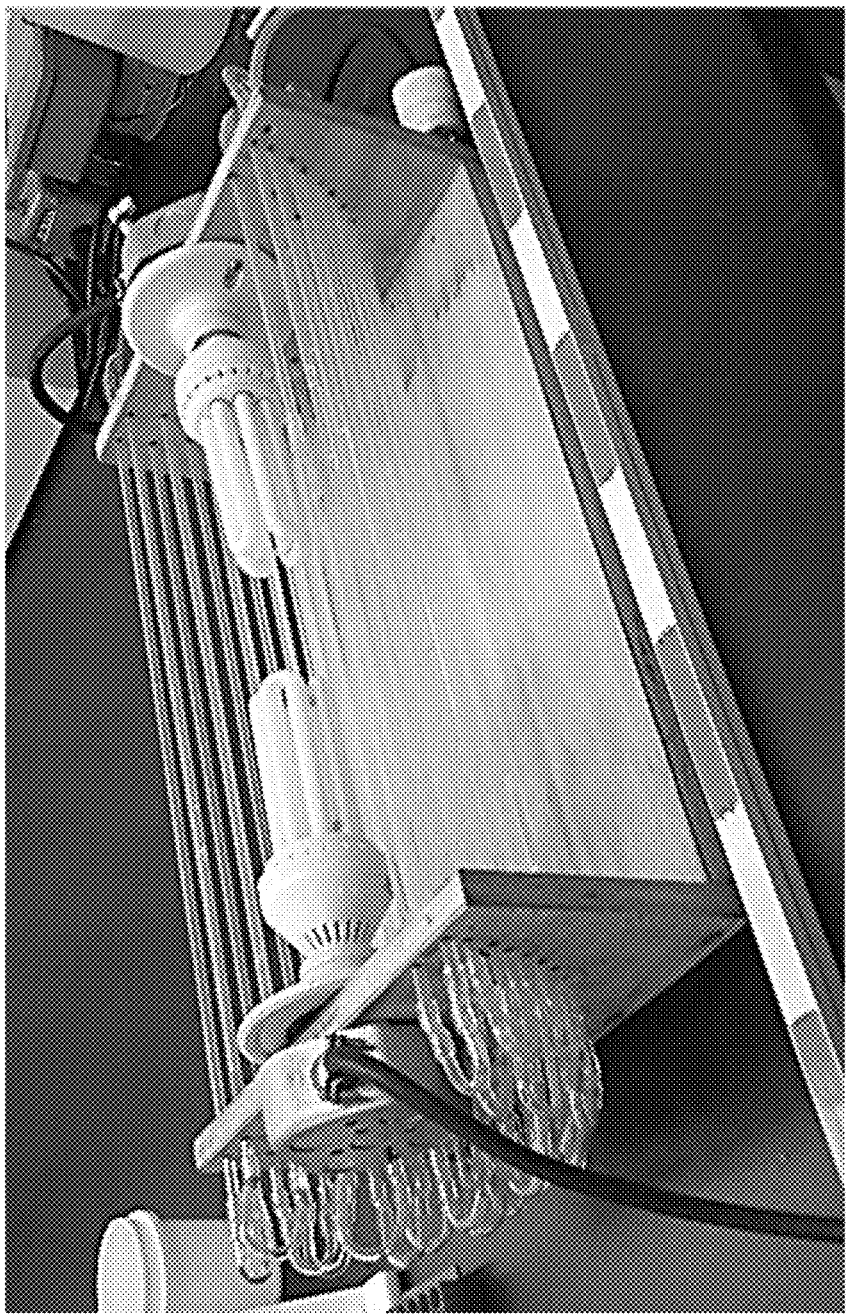
FIG. 5B is a picture of an example in-series photoreactor which includes borosilicate glass tubes coated with $TiO_2$ using compact fluorescent bulbs as a light source.

But further, because the wavelength of excitation falls in a region that is not interfered with by Pyrex glass, this indicates a continuous flow system using glass tubes can be used. Initially, an in-series photoreactor was designed and constructed which included glass tubes, the interior of the tubes was coated with $TiO_2$. (FIGS. 5A and 5B, which show a diagram and an image, respectively, of merely one example of an embodiment of the presently described in-series photoreactor) It should be appreciated that the number of tubes and the size of the tubes can be scalable according to a particular application and flow rate of the fluids being pumped through the photoreactors. A mixture of 25 ppm, MTBE, prepurged with $O_2$, was then pumped through the tubes and the entire system was exposed to fluorescent lights. Effluent streams were analyzed using gas chromatography (GC) to determine reactor efficiency. Samples taken before and after exposure to light showed that 9-12% of the initial mixture had reacted and been converted to reaction intermediates. By varying the MTBE concentration from 10-30 ppm, it was determined that the rate of the process was catalyst limiting, yielding a higher reaction percentage at lower substrate concentrations (about 17% at 10 ppm) and lower percentages at higher concentrations (8% at 30 ppm). The process was also determined to be dependent on the use of broad spectrum light as an ultra-violet (UV) light source produced No reaction. Finally, the use of sunlight produced a 45-50% reaction conversion. Overall, the process was shown to be viable.

The next step included designing a larger in-parallel reactor with a purgeless system to introduce $O_2$, for treating higher volumes of contaminants and increasing $TiO_2$ catalyst effects on the solution. The $O_2$ introduction problem was addressed through the use of silicon tubing that is selectively permeable to $O_2$. This introduces a constant $O_2$ concentration of 10-20 mg/L across the entire system of the reaction mixture.

Figure 6A:
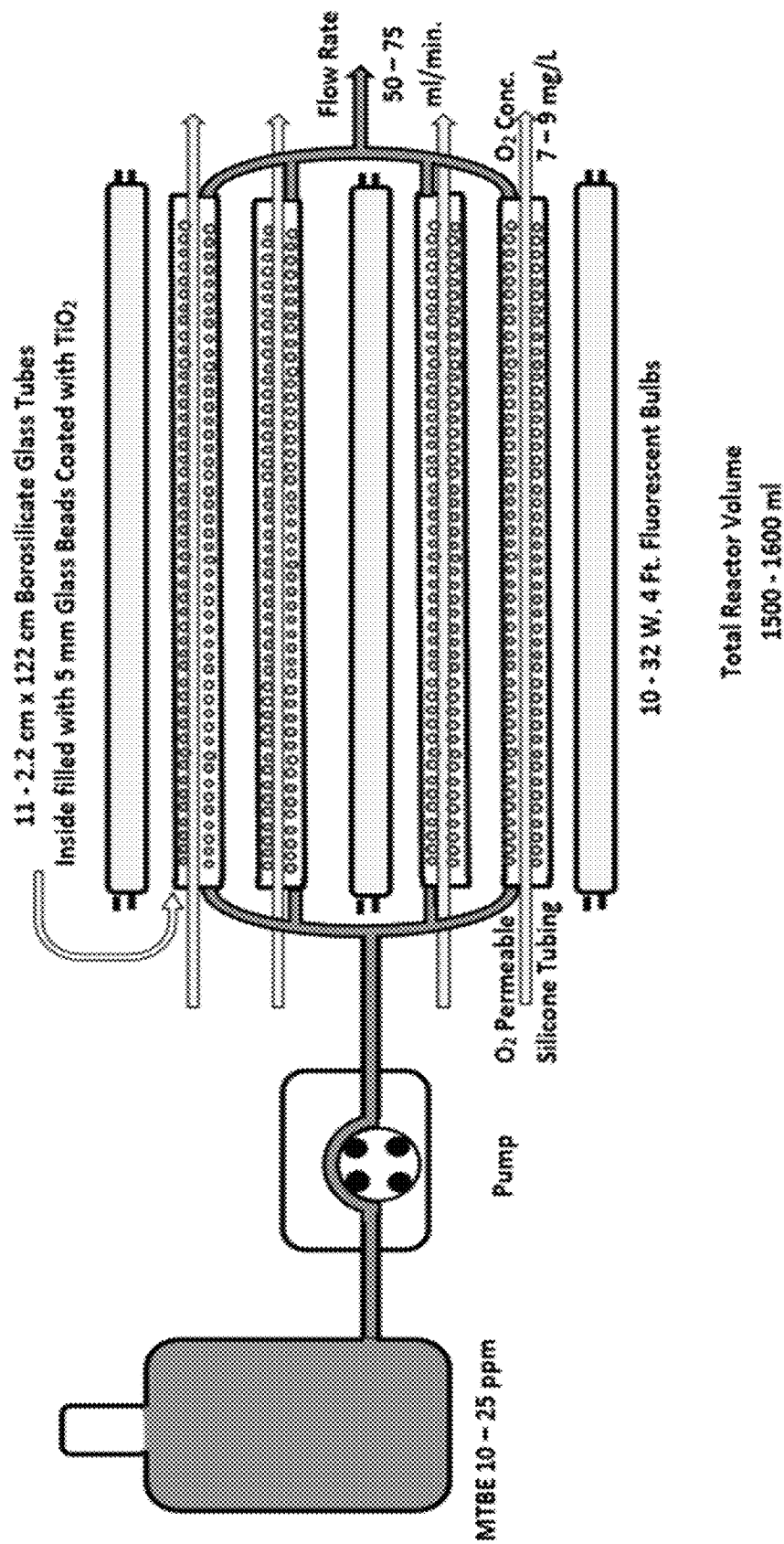
FIG. 6A are diagram of an example in-parallel photoreactor which includes glass tubes filled with glass beads coated with $TiO_2$ using fluorescent bulbs as the light source.
Figure 6B:
FIG. 6B is a picture of an example in-parallel photoreactor which includes glass tubes filled with glass beads coated with $TiO_2$ using fluorescent bulbs as the light source.

The larger photoreactor was constructed using eleven 1 m/25 mm glass tubes with a length of silicone tubing inside for oxygenation. It should be appreciated that although eleven tubes were used for this example, such use is not intended to be limiting and rather, the appropriate number of tubes can be used for a particular application. Each tube was then filled with 5 mm glass beads that had been coated with $TiO_2$. (FIGS. 6A and 6B, which show a diagram and an image, respectively, of merely one example of an embodiment of the presently described in-parallel photoreactor). When filled with water and after pressurizing, the system maintained an $O_2$ concentration of 10-15 mg/L. The photoreactor is equipped with a cover containing a bank of fluorescent light tubes.

When this larger photoreactor was tested using a contaminant stream of 25 ppm MTBE. Effluent streams were again analyzed using GC. Effluent samples showed a 9-10% substrate destruction at the flow rate of 50-75 ml/min. Mixtures of MTBE with concentrations of 15 ppm showed an 11-15% destruction of substrate. Varying the substrate concentration allows for the efficiency of the reactor at concentrations lower than 1 ppm to be estimated. Substrate concentrations were found to be reduced by 7-12% with higher destruction found at lower substrate concentrations. Again, the process is found to be catalyst limiting.

The in-parallel continuous flow system developed has several advantages over systems in the prior art. The purgeless oxygenation means that the $O_2$ concentration in solution is kept constant throughout the reaction process. The destruction of substrate is no longer limiter by $O_2$ in solution. Next, even though the process only produced a 10-15% destruction of substrate, the test concentrations (15-25 ppm) used were much higher than seen in typical pollutant streams (10-500 ppb). As the process is catalyst limited, these lower substrate concentrations should result in much higher rates of substrate destruction. Third, though the tests on the Continuous Flow Reactor was run using MTBE as substrate, the batch slurry results clearly demonstrate that the same process should also work for other water soluble ethers. Finally, the system tested was on a Very limited scale. Yet the reactor design is Not Limited by its size. It is fully expandable and the system can be expanded to a scale where it can be applied to a variety of alternate needs, including a municipal water system.

Those skilled in the art will recognize that numerous modifications can be made to the specific implementations described above. The implementations should not be limited to the particular limitations described. Other implementations may be possible. In addition, all references cited herein are indicative of the level of skill in the art and are hereby incorporated by reference in their entirety.

REFERENCES

1. Koch, Dale, "National Assessment of MTBE occurrence in Drinking Water", Proceedings of the Environmental Chemistry Division, 219th ACS National Meeting, San Francisco, Calif. March 2000, Vol. 40, No. 1, p. 202.
2. Garett, Moreau, Lowry, "MTBE as a Ground Water Contaminant". Proceedings of the Third National Conference on Petroleum Hydrocarbons and Groundwater, National Well Water Association, Dublin, Ohio, 1986.
3. Deeb, Chu, Shih, Linder, Suffet, Kavanaugh, Alvarez-Cohen, "MTBE and Other Oxygenates; Environmental Sources, Analysis, Occurance, and Treatment", Environ, Eng. Sci., 20 (5), 2003, p 433.
4. Barreto, Itkin, Gray, "Degradation of MTBE and its Byproducts using Photocatalysis and Bioremediation." Hazardous Waste Conference, Univ. of Notre Dame, September, 1992.
5. Ollis, Pelizzette, Serpone, "Heterogeneous Photocatalysis in the Environment: Applications to Water Purification." Photocatalysis: Fundamentals and Applications, (J. Wiley and Sons New York) 1989, p. 603-637.
6. Barreto, Gray, Anders, "Photocatalytic Degradation of MTBE in $TiO_2$ Slurries: A Proposed Reaction Scheme.", Wat. Res., 5, 1995, 1243.
7. Zang, Farnood, "Photocatalytic Decomposition of MTBE in Aqueous Slurry of $TiO_2$", Appl. Catal. B; Environ, In Press 57, 2005, p. 275-282.
8. Barreto, Barr, Chavis, "Photocatalytic Destruction of ETBE and TAME", Proceedings of the Environmental Chemistry Division, 219th ACS National Meeting, San Francisco, Calif. March 2000, Vol. 40, No. 1, p. 232.
9. Mehrab, Anderson, Moo-Young, Photocatalytic Degradation of THF, 1,4 Dioxane, and Their Mixtures with $TiO_2$", Int. J. of Photoenergy, 2, 2000, p 67.
10. Barreto, Wood. "Photocatalytic Destruction of MTBE, 1,4-Dioxane and Other Water Soluble Ethers using Visible Light", Proceedings of the Environmental Chemistry Division, 240th ACS National Meeting, Boston, Mass. August 2011.
11. Bideau M., Claudel B., Otterbein M., "Photocatalysis of Formic Acid Oxidation by Oxygen in Aqueous Medium", J. Photochem., 14, 1980, p. 291.
12. Bideau M., Claudel B., Kazouau H., "Photo-Oxidation of Acetic Acid by Oxygen in the Presence of and Dissolved Copper Ions", J. Photochem. Photobiol. A, Chem., 61, 1991, p. 269.
13. Schwarzenback R. P., Gschwend P. M., Imboden D. M., Environmental Organic Chemistry., John Wiley and Sons., New York, 1993.

The invention claimed is:
1. A method for achieving degradation of ether-containing organic contaminants, wherein the method comprises exposing an organic contaminants-containing starting material to oxygen, a catalyst comprising $TiO_2$, and an ultraviolet (UV)

light source to thereby achieve degradation of said ether to $CO_2$, wherein the degradation is achieved with a photocatalytic system comprising an ultraviolet (UV) light source, a series of continuous flow photoreactors, an oxygen supplying device capable of providing oxygen to said photoreactors, and a catalyst comprising $TiO_2$, and wherein the photoreactors comprise borosilicate glass tubes, wherein the method comprises introducing the ether-containing organic contaminants into the photocatalytic system; allowing the ether-containing organic contaminants to be exposed to the catalyst comprising $TiO_2$, oxygen, and the ultraviolet (UV) light when the ether-containing organic contaminants are flowing through the photocatalytic system; and converting the ether-containing organic contaminants to $CO_2$.

2. The method of claim 1, wherein the UV light source comprises fluorescent light.

3. The method of claim 1, wherein the UV light source comprises sunlight.

4. The method of claim 1, wherein the oxygen is delivered in a constant concentration and is delivered by silicone tubing capable of providing oxygen with constant concentration.

5. The method of claim 1, wherein the organic contaminants comprise at least one of tertiary butyl ether (MTBE), ethyl tert-butyl ether (ETBE), tert-Amyl methyl ether (TAME), or dioxane.

6. The method of claim 1, wherein the catalyst is coated onto glass beads.

7. The method of claim 1, wherein the photocatalytic system comprises at least two photoreactors, wherein the at least two photoreactors are connected in parallel.

8. The method of claim 1, wherein the oxygen is provided with a concentration of 10-20 mg/L.

* * * * *